April 30, 1968     J. W. SPROUT ET AL     3,380,757

TRAILER HITCH ASSEMBLY

Filed Sept. 12, 1966

INVENTORS
John W. Sprout
Kenneth I. Sprout
Thomas William Stein

BY *Hovey, Schmidt, Johnson & Hovey*

ATTORNEYS

United States Patent Office 3,380,757
Patented Apr. 30, 1968

3,380,757
TRAILER HITCH ASSEMBLY
John W. Sprout, Kenneth I. Sprout, and Thomas William Stein, all of Gypsum, Kans. 67448
Filed Sept. 12, 1966, Ser. No. 578,777
6 Claims. (Cl. 280—406)

This invention relates to trailer hitches and the like, and particularly to a trailer hitch assembly having integral stabilizing apparatus.

It is the primary object of the instant invention to provide a trailer hitch assembly having integral stabilizing apparatus whereby to substantially preclude swaying of the trailer and yet permit swinging of the latter relative to a towing vehicle to negotiate a turn. In this respect, the stabilizing apparatus of the instant invention provides a restoring force to assist in the alignment of the trailer after the turn has been negotiated.

As a corollary to the foregoing object, it is a very important aim of the present invention to provide such stabilizing apparatus wherein is included a torsion bar swingable with one of the vehicles relative to the other vehicle, a crank arm extending vertically from the torsion bar, and a connector rod connecting the other vehicle and the free end of the arm whereby relative swinging of the towed vehicle with respect to the towing vehicle causes the arm to be shifted around the longitudinal axis of the torsion bar so that the torsional strength of the latter resists the relative swinging of the vehicles.

A very important object of the instant invention is to provide such a torsion bar having a pair of arms on respective opposite ends thereof and extending in the same direction therefrom, and wherein the arms are disposed on opposite sides of the axis of relative swinging of the vehicles whereby one arm is pushed in one direction, while the other arm is pulled in the opposite direction whereby the twisting forces applied to the torsion bar are additive and each arm acts to resist the torque placed on the bar by the other arm.

Other objects will be explained or become apparent as the following specification progresses.

Figure 1:
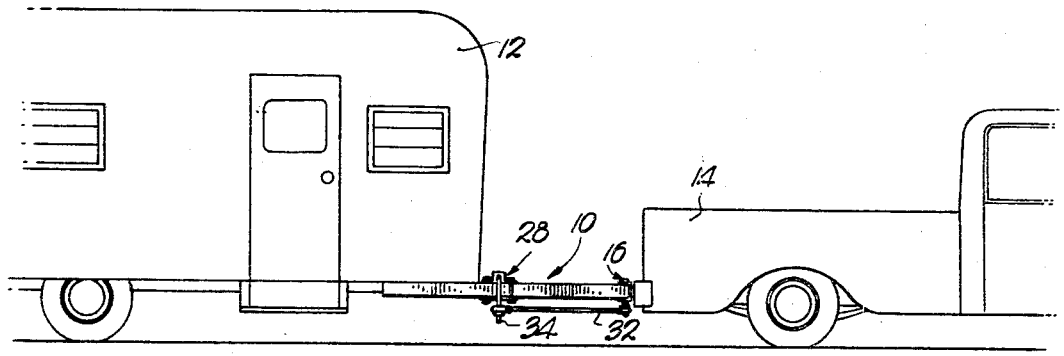
FIGURE 1 is a side elevational view of a trailer hitch assembly embodying the concepts of the instant invention in operating position between a trailer vehicle and a towing vehicle.

A trailer hitch assembly broadly designated by the numeral 10 is shown in FIG. 1 operably connecting a towed trailer or vehicle 12 and a towing vehicle or truck 14. Assembly 10 includes a pivotal hitch 16 connecting the forwardmost end of a pair of convergent drawbars 18 rigidly carried by trailer 12 with the rearmost extremity of truck 14. As can be seen viewing FIGS. 1 and 2, vehicles 12 and 14 are relatively swingable about an upright axis extending longitudinally of pivot pin 20. A pillow block 22 is carried by each drawbar 18. Each block 22 has a horizontal bore 24 therein aligned with the bore 24 of the other block 22. Bores 24 receive the central portion 26 of a torsion bar 28 therethrough as can best be seen in FIG. 2. Portion 26 is disposed to extend transversely of the path of travel of vehicles 12 and 14 thereabove. An elongated crank arm 30 extends downwardly from each end of portion 26.

Figure 2:
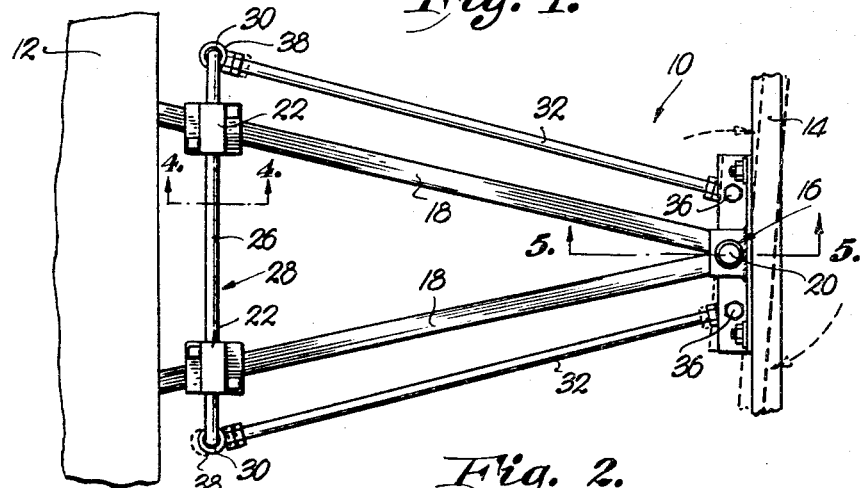
FIG. 2 is an enlarged plan view looking downwardly at the trailer hitch assembly illustrated in FIG. 1.
Figure 3:
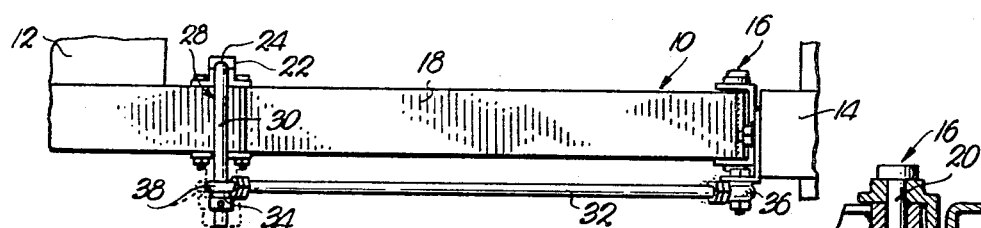
FIG. 3 is a side elevational view of the trailer hitch assembly shown in FIG. 2.
Figure 4:
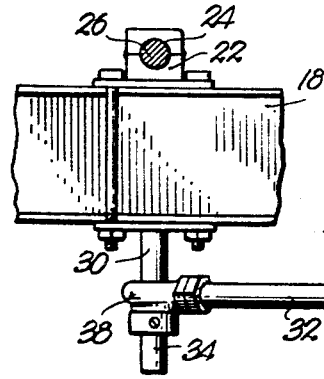
FIG. 4 is an enlarged, elevational, detail view taken along line 4—4 of FIG. 2.
Figure 5:
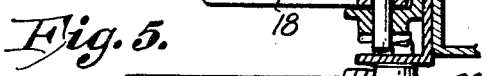
FIG. 5 is an enlarged, elevational detail view partially in cross section taken along line 5—5 of FIG. 2.

It can be seen viewing FIG. 2 that one arm 30 is disposed on one side of pin 20, while the other arm 30 is disposed on the opposite side of pin 20. Connector means in the nature of a pair of elongated elements 32 connect vehicle 14 with the free end 34 of respective arms 30. One end of each element 32 is mounted on vehicle 14 by a respective pivot 36, while the opposite end of each element 32 is provided with bearing means 38 pivotally coupling corresponding free ends 34 with respective elements 32. It can be seen viewing FIG. 2 that pivots 36 are disposed on opposite sides of hitch 16, and each pivot 36 mounts its respective element 32 for swinging a vehicle 14 about an axis substantially parallel to the axis of relative swinging of vehicles 12 and 14.

Elements 32 and torsion bar 28 cooperate to present stabilizing apparatus for causing vehicle 12 to properly trail vehicle 14 and for applying a restoring force to the trailer 12 to cause the same to move back into alignment with truck 14 whenever an external force has caused the vehicles 12 and 14 to become nonaligned.

The operation of assembly 10 is illustrated in FIG. 2. The dashed lines indicate the relative positions attained by vehicles 12 and 14 after a certain degree of movement in the direction indicated by the arrows. Torsion bar 28 is carried by vehicle 12 and swings about the axis of pin 20 with vehicle 12. As vehicle 14 swings relative to vehicle 12 and bar 28, the lower (FIG. 2) element 32 pushes the free end 34 of one arm 30 toward vehicle 12, while the upper (FIG. 2) element 32 draws the free end 34 of the other arm 30 away from vehicle 12. Thus, central portion 26 is twisted during relative swinging of vehicles 12 and 14 about the axis of pin 20, and the torsional strength of bar 28 resists such swinging. Furthermore, after arms 30 have been displaced relative to the longitudinal axis of portion 26, arms 30 apply a restoring force to vehicles 12 and 14 through blocks 22 and elements 32 respectively, to cause vehicles 12 and 14 to return to their aligned, relative positions.

The simplicity of assembly 10 permits economical construction of the same while providing positive stabilization of trailer 12. Furthermore, the novel construction of assembly 10 provides 3-point attachment of trailer 12 to the towing vehicle 14 for maximum safety. Thus, it can be seen that assembly 10 operates in a manner to fulfill all of the objects, aims and purposes of the instant invention in a substantial sense.

It is to be appreciated that while the pivotal hitch 16 and the pivots 36 are illustrated in their preferred form in the embodiment shown in the drawings, ball and socket hitches could be used instead of the arrangement shown for hitch 16 and pivots 36 with substantially equal results.

Having thus described the invention, what is claimed as new and desired to be secured by Letters Patent is:

1. In a trailer hitch assembly having a pivotal hitch connecting a towing vehicle and a trailer vehicle for relative swinging movement about an upright axis disposed between the vehicles, stabilizing apparatus comprising:

a torsion bar coupled to one of said vehicles for limited movement with respect thereto, and swingable therewith, said bar having an elongated, generally horizontal, central portion extending laterally of the path of travel of said vehicles thereabove, and elongated crank means extending generally vertically from said portion at a location for swinging toward and away from said other vehicle as the one vehicle and said bar swing relative to the other vehicle; and connector means attached between said other vehicle and said crank means for shifting the latter relative to the longitudinal axis of said portion and twisting the portion during relative swinging movement of said vehicles, whereby the torsional strength of the portion resists said swinging.

2. The invention of claim 1,
the ends of said portion being disposed on opposite sides of said axis for swinging of one end thereof toward the other vehicle as the opposite end thereof swings away from the other vehicle during relative swinging movement of the vehicles,
said crank means including an elongated arm at each end of the portion,
said arms extending from said portion in substantially the same direction.

3. The invention of claim 2,
said connector means including a pair of elongated elements, each element being attached between the other vehicle and the free end of a respective arm.

4. The invention of claim 3,
each element including a pivot on one end thereof remote from said arm,
each pivot mounting its element on said other vehicle for swinging movement about an axis substantially parallel to said upright axis,
said pivots being disposed on respective opposite sides of said hitch.

5. The invention of claim 4,
said arms extending generally vertically downwardly from said portion,
said elements being generally horizontal,
there being means pivotally connecting the opposite end of each element and the lowermost end of a respective arm.

6. The invention of claim 2,
and means mounting said bar on said one vehicle for rotation about the longitudinal axis of said portion.

References Cited

UNITED STATES PATENTS

| | | | |
|---|---|---|---|
| 2,711,908 | 6/1955 | Saxon | 280—406 |
| 2,872,212 | 2/1959 | Hume | 280—406 |
| 2,906,544 | 9/1959 | Watts | 280—406 |
| 3,306,628 | 2/1967 | Haxton | 280—406 |
| 3,331,618 | 7/1967 | Head et al. | 280—406 |

BENJAMIN HERSH, *Primary Examiner.*

J. SIEGEL, *Assistant Examiner.*